United States Patent [19]
Fini, Jr.

[11] Patent Number: 5,957,803
[45] Date of Patent: Sep. 28, 1999

[54] CLUTCH AND CONTINUOUSLY VARIABLE TRANSMISSION

[76] Inventor: Anthony W. Fini, Jr., 4273 Mundy St., Blasdell, N.Y. 14219

[21] Appl. No.: 09/122,609

[22] Filed: Jul. 27, 1998

Related U.S. Application Data

[63] Continuation-in-part of application No. 08/555,275, Nov. 8, 1995.

[51] Int. Cl.⁶ ........................................ F16H 3/44
[52] U.S. Cl. ............................ 475/306; 475/305
[58] Field of Search ................... 475/296, 305, 475/306

[56] References Cited

U.S. PATENT DOCUMENTS

| | | | |
|---|---|---|---|
| 657,056 | 8/1900 | Blomstrom | 475/305 X |
| 676,234 | 6/1901 | Humpage et al. | 475/306 |
| 1,000,406 | 8/1911 | Heller | 475/306 |
| 1,163,842 | 12/1915 | Munsing | 475/306 X |
| 1,210,461 | 1/1917 | Glick | 475/305 X |
| 1,963,308 | 6/1934 | Molinelli | 475/306 |
| 2,482,298 | 9/1949 | Stegkemper | 475/306 |
| 5,505,669 | 4/1996 | Im | 475/306 |
| 5,564,992 | 10/1996 | Cunningham | 475/273 X |

*Primary Examiner*—Khoi Q. Ta

[57] ABSTRACT

The invention comprises a simple and efficient transmission for varying speed and engagement of power, comprising a planetary drive with input means driven by a prime mover's output, scheduled friction clutch means for gradually slowing and stopping rotation of an idler wheel member of the planetary drive so that as the force of the clutch is increased, power is automatically transferred from the idler wheel member to the output of the planetary drive, starting with a slow speed with high torque to a fast speed with lower torque by scheduled increments which enable rotation of the output shaft, under load resistance, without prime mover stall.

17 Claims, 5 Drawing Sheets

5,957,803

CLUTCH AND CONTINUOUSLY VARIABLE TRANSMISSION

This application is a continuation-in-part of copending application Ser. No. 08/555,275, filed Nov. 8, 1995.

BACKGROUND OF THE INVENTION

U.S. Pat. No. 1,732,405 discloses a motor transmission unit which has an engine charging compressor for controlling the speed of a wheel member of a bevel gear type planetary drive, the compressor's resistance acting to vary the output speed of the transmission. This device lacks a means for gradually stopping the planetary drive wheel member, the motor transmission unit is complex and as a result the transmission is not very efficient.

U.S. Pat. No. 4,973,295 discloses a stepless variable ratio transmission which has a worm gear assembly for controlling the speed of a wheel member of a conventional type planetary drive and uses a stepping motor to control the speed of the worm and vary the speed of the transmission. This device has the disadvantage of being complex with the worm gear assembly and stepping motor, and requires additional power to operate the stepping motor.

U.S. Pat. No. 838,655 discloses a hoisting device which has a manually operated band brake for stopping an idler wheel member of a gear arrangement to actuate lifting movement of the hoist. The device transfers power in a lift or non-lift schedule, and has no means to engage at a variable lifting speed through a changing variable gear ratio.

None of the aforementioned patents appear to provide insights or practical solutions to the problem of adaptation of alternate directional output power and speed control through a continuous variable gear ratio using a common gear train.

It is an object of the invention to provide a transmission capable of output shaft speed control through a continuously variable gear ratio drive train.

It is another object of the invention to provide a simple mechanism for alternate output direction control through a common continuous variable gear ratio drive train.

SUMMARY OF THE INVENTION

The present invention constitutes a simple, efficient and inexpensive transmission for varying speed and engagement of power through a unique combination of a planetary drive and a clutch arranged to gradually slow and stop a wheel member to vary the output speed of the transmission.

In the invention, the planetary drive means comprises a rotatable idler member engaged among input and output means, with the input means arranged to rotate responsive to the unidirectional rotation of a shaft driven by a prime mover such as a gasoline engine, electric motor, or the like suitable power source. The idler member comprises an idler shaft fixedly mounted to a rotatable housing of the planetary drive, the idler shaft being arranged to rotate radially about an axis of the input means by means of a pinion member which is rotatably mounted to the idler shaft and engages both the input means and the output means. A scheduled friction clutch means is arranged to gradually slippingly engage rotation of the output means of the planetary with rotation of the housing. A brake means is also arranged to engage the housing and prevent rotation thereof.

Thus, with the brake means being disengaged, as the clutch gradually engages the rotating housing, the output means gradually turns with increasing speed in the direction of the rotation of the housing until its rotation corresponds to the rotation of the housing. When the clutch is disengaged from the housing, and brake means gradually engages the housing, the output means gradually turns with increasing speed to and in the direction opposite the rotational direction of the housing. In either direction of output shaft movement, the rotational movement of the output shaft is initiated at a first gear ratio and automatically moves through a variable change in gear ratio until the clutch locks with the housing rotation or the brake stops the rotational movement of the housing, while the transfer of power to the output shaft starts with a slow speed at high torque progressing in scheduled increments to a fast speed with lower torque.

The combination of the invention is a simple arrangement which is less costly to manufacture to provide an excellent transmission schedule which has the ability to provide automatic continuous variable input to output speed ratios, for example from about 3:1 to about 1:1.

DETAILED DESCRIPTION OF THE INVENTION

Figure 1:
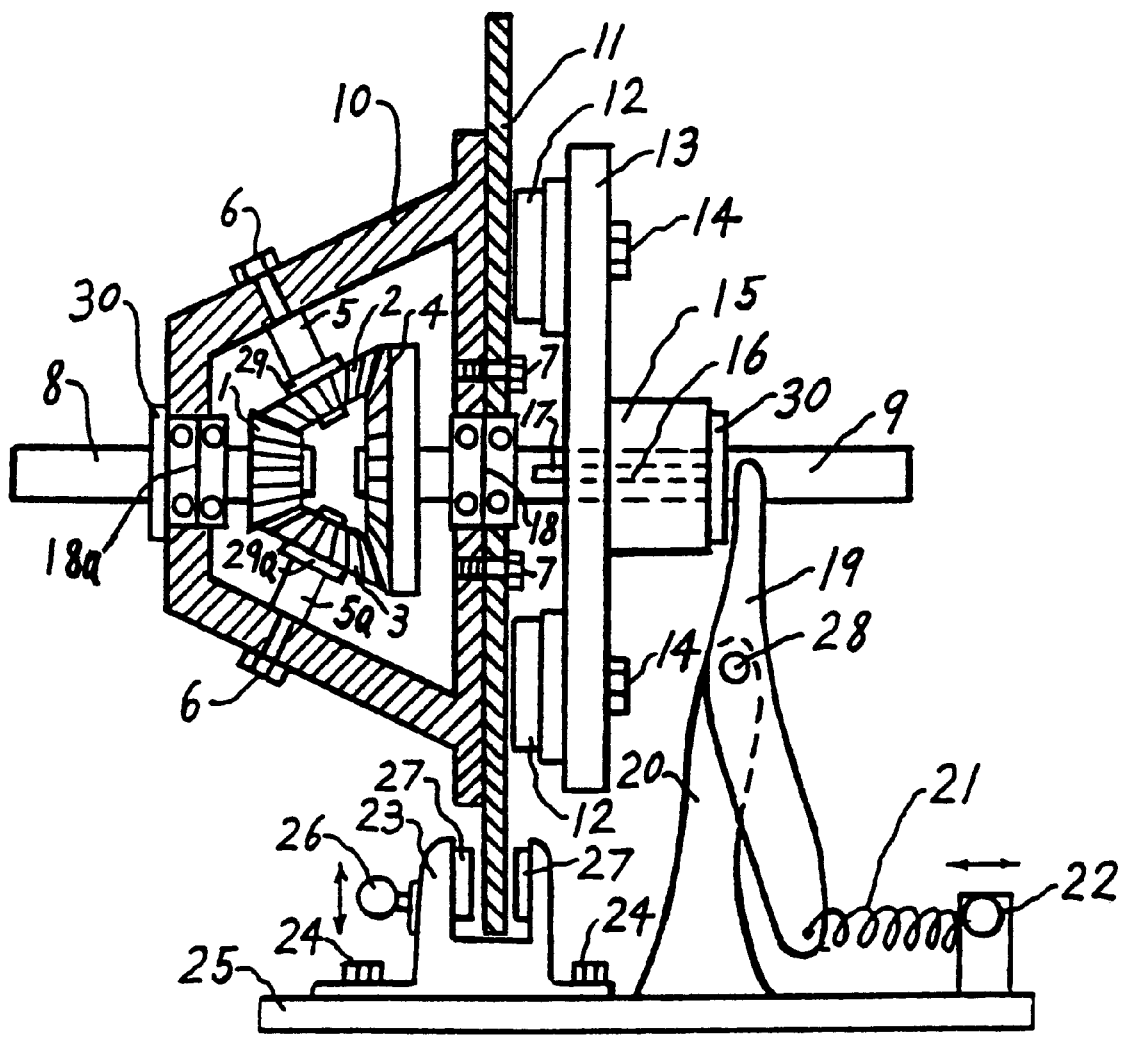
FIG. 1 is a partial sectional, side view of a device of the invention.

Beginning with FIG. 1, therein is shown a transmission arrangement of the invention wherein input shaft 8 is mounted, by means of bearing 18a, through planetary housing 10 and comprises bevel gear 1, rigidly mounted to an end thereof. Output shaft 9 is mounted by bearing 18 about coaxially to shaft 8 in housing 10, and has a rigidly mounted bevel gear 4 rigidly mounted to about its end, facing bevel gear 1. Pinion bevel gears 2 and 3 are rotatably mounted on axles 5, 5a with thrust washers 29, 29a being arranged to engage thrust load imposed upon the pinions and axles. Axles 5, 5a are secured to the housing 10 by bolts 6. The bevel gears 1–4 are sized and dimensioned to matingly engage with one another as illustrated. Though not specifically illustrated, the gear assembly is generally sealed and maintained in oil or the like.

The clutch assembly generally comprises clutch plate 13, hub 15 and clutch pads 12. Pressure plate 11 is mounted to housing 10 by bolts 7, and clutch plate 13 is rigidly mounted to hub 15. Hub 15 comprises a keyway 16, which is arranged to slidably mount hub 15 along output shaft 9 while fixing hub 15 from rotating around output shaft 9. Removable clutch pads 12 are mounted to clutch 13, spaced from each other, with retaining bolts 14 and the entire clutch assembly is slidably mounted on output shaft 9 along key 17, arranged to engage pressure plate 11.

Control mount 25 comprises pivot 20 which has one or dual clutch bar(s) 19 secured by pin 28 thereto so that one end of clutch bar 19 can be pivoted to engage hub 15 and exert pressure against thrust bearing 30 and hub 15 when forward actuator 22 pulls spring 21. Reverse brake caliper 23, comprises brake pads 27 and is engaged by means of reverse actuator 26, which is shown as being mounted to control mount 25 with bolts 24.

Mounting of the planetary transmission is not shown, but can be achieved in any convenient manner. For example, separate bearings with mounting means for supporting both the input and output shafts can be used, or, a rigid coupling can be arranged to secure the input shaft directly to the output shaft of a prime mover, or, the input shaft of the transmission can be integral with the prime mover's output. In the illustrated embodiment of FIG. 1, an additional thrust bearing 30 is shown on the input shaft 8 for resisting counter-thrust load on the housing 10.

In operation, input shaft 8 is driven by the output of a prime mover, such as for example an engine, motor or the like. Bevel gear 1 of input shaft 8 drives both pinion bevel gears 2 and 3 of axles 5 and 5*a* which in turn rotate around bevel gear 4. When output shaft 9 is at rest and clutch 13 disengaged, the rotation of bevel gear 1 will revolve housing 10 and pressure plate 11. If forward actuator 22 is moved to cause clutch bar 19 to engage hub 15 and move clutch plate 13 to frictionally engage clutch pads 12 in scheduled increments with rotating pressure plate 11, power is gradually transferred to output shaft 9. In such enablement, the idler wheel member comprises housing 10, pinions 5, 5*a* and pressure plate 11 and the entire planetary revolves to provide efficient power to output shaft 9.

In the illustrated embodiment of FIG. 1, bevel gear 1 is shown as being about half the size of bevel gear 4, such that starting with a stopped vehicle and engagement of the incrementally scheduled friction clutch, the transmission will automatically move through a gear ratio from about 3:1 ratio in respect to engine speed to a 1:1 ratio.

If the engine or motor speed is increased cooperatively during the gradual scheduled engagement of the clutch, the vehicle experiences additional acceleration from both the increase in engine speed and the upward change in gear ratio, thus enhancing acceleration. If the vehicle load is increased, as for example through a change in terrain such as movement up a hill, vehicle speed can be maintained by prime mover accelerator control alone, or in combination with frictional clutch disengagement to reduce output shaft gear ratio. Complete release of the frictional clutch facilitates bringing the vehicle to a stop through a general wheel braking system.

Actuation of brake caliper 23 on pressure plate 11 enables a reverse drive to output shaft 9, with the planetary housing 10 being slowed or stopped, output shaft 9 reversing direction and turning at a reduced speed ratio compared to the forward maximum speed.

While the basic operation of the invention has been illustrated, many modifications are possible and are within the contemplation of the invention. For example, the relative gear ratios amongst bevel gears 1–4 can be altered and/or replaced by frictionally engaging elastomeric and the like wheels or discs. Thus, gear ratio changes greater and/or less than 1:1 to 1:3 or more are conveniently achieved using the method and device of the invention.

Figure 2:
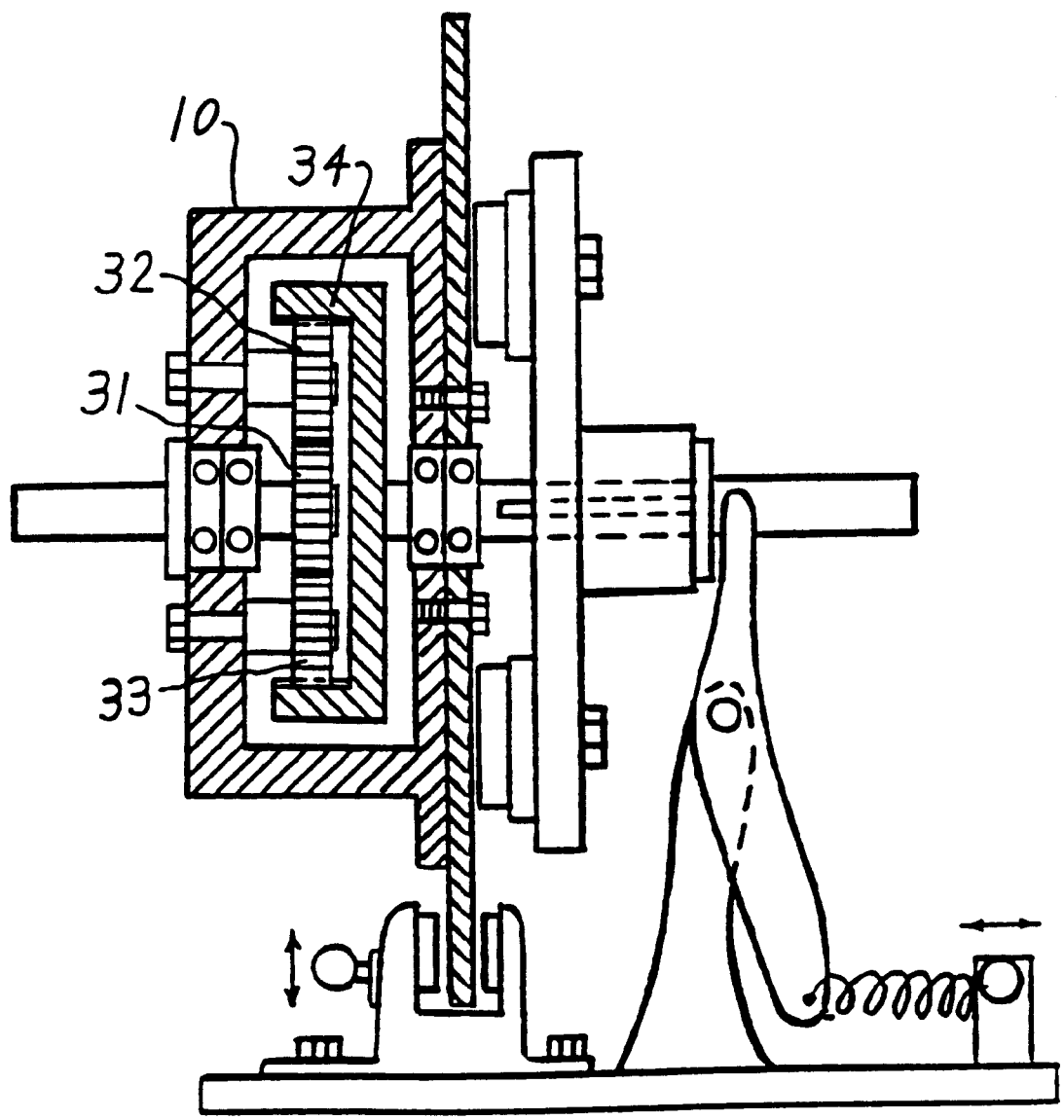
FIG. 2 is a partial sectional, side view of a further device of the invention.

FIG. 2 illustrates another embodiment of the invention, wherein the planetary gear arrangement comprises a simple conventional planetary drive with ring gear 34 replacing bevel gear 4, sun gear 31 replacing bevel gear 1, and planet gears 32 and 33 replacing bevel gears 2 and 3. As can be seen, the operation of this embodiment is the same as described in FIG. 1.

Figure 3:
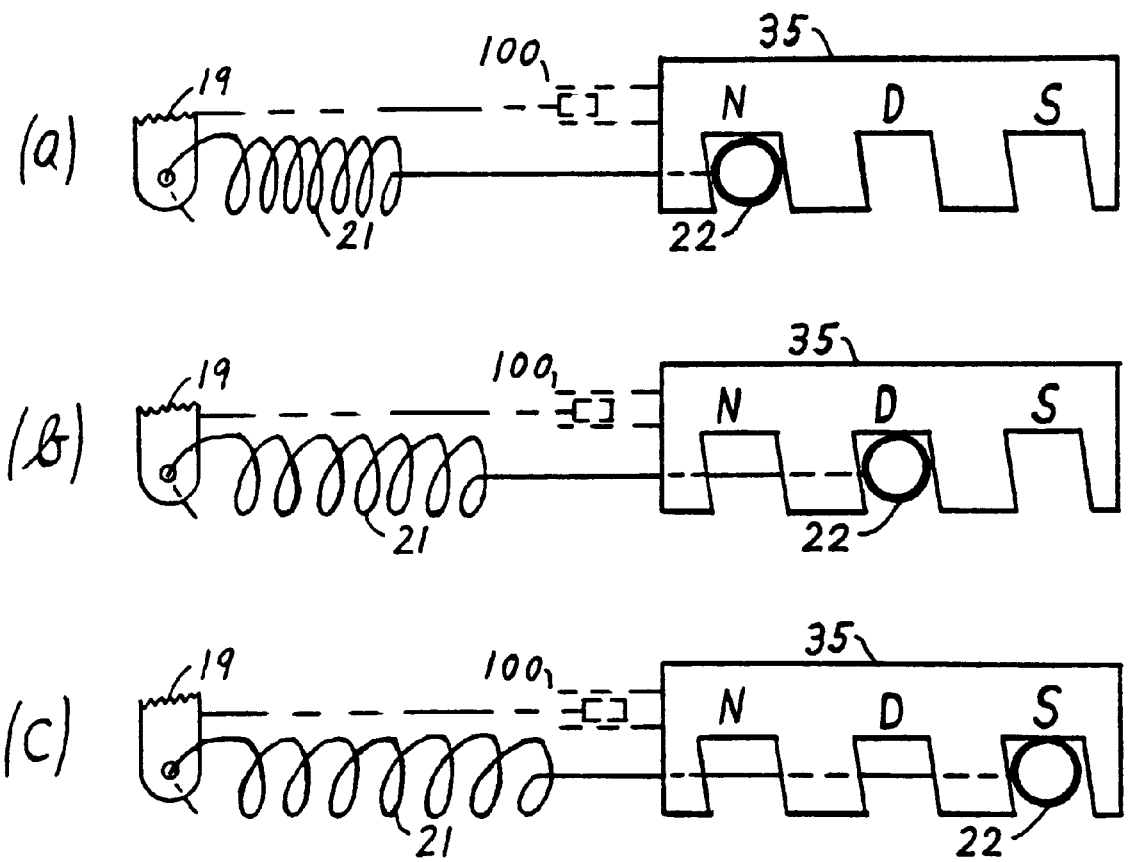
FIG. 3 is a diagrammatic illustration of a linkage control assembly for engaging the clutch of the invention.

FIG. 3, illustrates a linkage control assembly which appears particularly suitable for controlling the clutch mechanism of the invention. Therein, position (a) is illustrated as being a neutral position wherein clutch 13 is disengaged and no forward power is transferred to output shaft 9. In such position, reverse brake actuator 26 can engage brake caliper 23 enabling reverse rotation of output shaft 9. Position (b) locks forward actuator 22 in the slotted plate 35 for forward drive. The fulcrum advantage of clutch bar 19 on pivot 20, its length of travel, the tension and length of extension travel spring 21, and the adjustable time delay characteristics of such system provides a programmable schedule means for enabling clutch 13. In addition, a small pneumatic cylinder, piston and rod assembly 100, shown in phantom, can slow the movement of clutch bar 19 and provide adjustable time delay. Position (c) provides an optional sport mode for the transmission in the event a motor vehicle operator wishes to accelerate extremely fast and the speed of the prime mover is initially set very high. In this position, the amount of frictional clutch force engagement is further increased providing faster vehicle acceleration, more efficiently and with less wear on the pads 12.

Figure 4:
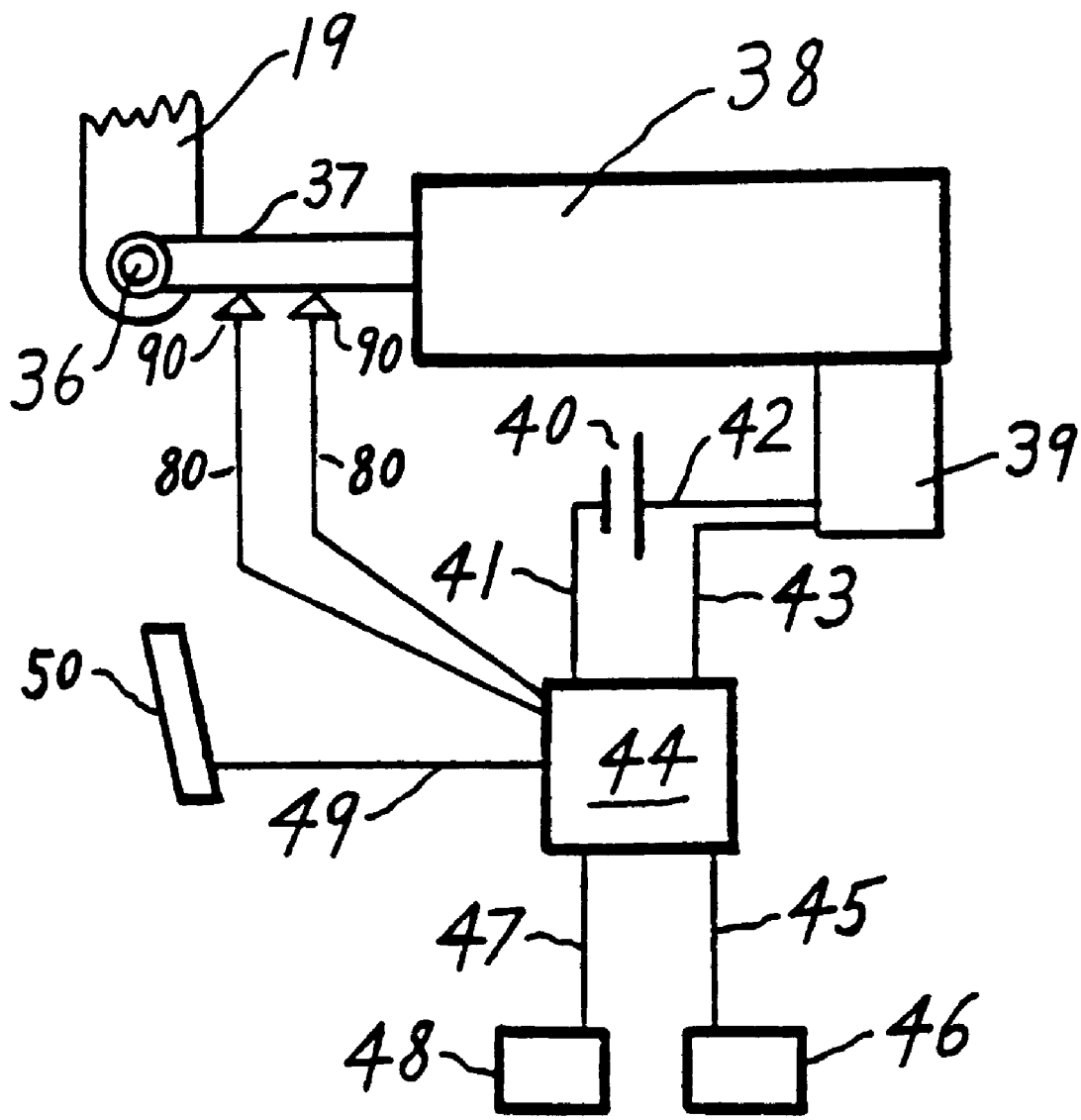
FIG. 4 is a diagrammatic illustration of an electromechanical control device for operation with a device of the invention.

FIG. 4, illustrates electronic computerized means for scheduling engagement of the friction clutch. Therein, a linear actuator comprising an electric motor with a low current draw powering a screw section 38 which moves a plunger 37, provides the means for engaging clutch 13. The end of plunger 37 is connected to the clutch bar 19 with large pin 36 and by scheduled increments gradually slows and stops the idler member of the planetary. Power supply 40 through conductors 41, 42 and 43 power electric motor 39 with computer 44 assisting control movement in forward, reverse and off positions. A prime mover speed sensor 46 is connected to the computer 44 by conductor 45, a vehicle wheel speed sensor 48 is connected to the computer 44 by conductor 47, and conductor 49 connects the vehicle's accelerator pedal 50 to computer 44. Although more complex than simple linkage, this method not only allows for speed programmability, but both the speed and torque requirement can be automatically scheduled. For example, when the motor vehicle encounters a hill and the planetary idler member is stopped, the operator depresses the accelerator pedal 50 while the engine speed begins to decrease. The computer 44 senses the situation and the linear actuator incrementally decreases the force on clutch bar 19 so that the transmission automatically gradually moves into a lower gear ratio.

Figure 5:
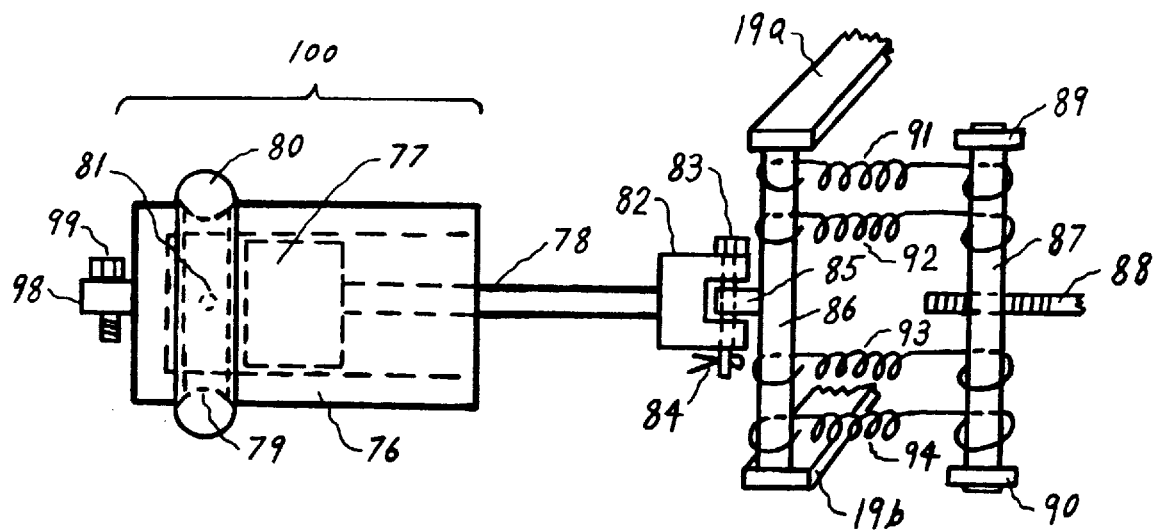
FIG. 5 is a diagrammatic illustration of another linkage control assembly for engaging the clutch of the invention.

FIG. 5 illustrates a pneumatic dampening system as shown in FIG. 3 in a control assembly which is particularly suitable for controlling the clutch mechanism of the invention. Therein, two clutch arms 19*a* and 19*b* are arranged to engage the hub of the clutch at their opposite ends (not shown) to urge the clutch plate toward the pressure plate. The clutch arms are connected to bar 86 for correlated movement and bar 86 is connected to bar 87 through multiple springs 91–94. Bar 87 comprises retainers 89 and 90 to prevent the springs from wandering off the end thereof. In the operation of the device, bar 87 is pulled away from bar 86, and adjustable linking bar 88 is shown as being the link through which the pulling effort is applied. In use, a suitable lever arrangement such as a pedal or the like would be connected to linking bar 88 to provide means for pulling bar 88. Coupling 82 is "U" shaped and comprises holes through its legs through which bolt 83 secures connecting piece 85 thereto. Connecting piece 85 is connected to bar 87 and comprises a hole to receive bolt 83 which is retained in coupling 82 by pin 84. Rod 78 adjustably connects coupling 82 to pneumatic assembly 100. Pneumatic assembly 100 comprises cylinder 76 and piston 77 which is actuated by connecting rod 78. Anchor 98 is arranged to mount cylinder 76 to an appropriate mounting frame (not shown) by means of bolt 99. Cylinder 76 comprises circumferential groove 79 and vent hole 81. The circumferential groove is sized to mount elastomeric ring 81 so that as clutch arms 19*a* and 19*b* are actuated, ring 80 blocks vent hole 81 and creates a vacuum which delays the force of the movement of the clutch plate toward the pressure plate. When the force is relaxed on springs 91–94, piston 77 easily returns to its original position since air leaks through hole 81 between groove 79 and ring 80. Control rod 88 is threaded into bar 87 to adjust the resting tension, the number of springs and their tension strength is variable, and the pneumatic assembly can be properly sized so that this system provides a simple but effective automatic schedule means for incrementally engaging the clutch with the pressure plate.

I claim:

1. A planetary drive arrangement comprising:

an idler member engaged among input and output means, said input means arranged to rotate responsive to urging from a prime mover;

said idler member comprising an idler shaft fixedly mounted to a rotatable housing of said planetary drive, said idler shaft being arranged to rotate radially about an axis of the input means by means of a pinion member rotatably mounted to said idler shaft and arranged to engage said input means and said output means;

a housing rotatably mounted to said input and output means;

a scheduled friction clutch means, arranged to gradually engage and disengage rotation of said output means, to rotation of said housing; and brake means arranged to engage said housing and prevent rotation thereof.

2. An arrangement as specified in claim 1, wherein said input and output members comprise wheel members arranged to engage said pinion member.

3. An arrangement as specified in claim 2, wherein said wheel members comprise bevel gears arranged to engage said pinion member.

4. An arrangement as specified in claim 2, wherein said wheel members are of the same size, and said planetary drive input to output speed ratio is increased starting from a 2:1 speed ratio to a speed ratio of 1:1.

5. An arrangement as specified in claim 2, wherein one wheel member is smaller than another wheel member and the speed ratio amongst said wheels is greater than about 2:1.

6. A clutch and continuously variable transmission comprising, a planetary drive having input means connected to a prime mover's output to be driven thereby, scheduled friction clutch means for gradually slowing and stopping the rotation of an idler wheel member of said planetary drive relative to said clutch means so that when the force of said clutch means resisting rotation is increased, power is transferred from said idler wheel member to an output means of said planetary drive, starting with a slow speed with high torque to a fast speed with lower torque by scheduled increments to enable rotation of an output shaft, under load resistance, without prime mover stall, wherein the planetary drive input to output speed ratio is increased from an about 3:1 speed ratio to a speed ratio of 1:1.

7. A transmission as recited in claim 6 wherein when the force of said clutch means is variable decreased, said planetary drive output means resumes a slow speed at high torque from said faster speed and lower torque whereby said transmission is continuously variable.

8. A transmission as recited in claim 6, wherein said planetary wheel members are bevel gears.

9. A transmission as recited in claim 6, wherein said clutch means has a plurality of removable individual friction pads.

10. A transmission as recited in claim 6 wherein said planetary drive output means rotates in a forward direction when said idler wheel member rotates in the same direction, and said transmission comprises means for enabling said planetary drive output means to rotate in a direction opposite said forward direction.

11. A clutch and continuously variable transmission comprising, a planetary drive having input means connected to a prime mover's output to be driven thereby, scheduled friction clutch means for gradually slowing and stopping the rotation of an idler wheel member of said planetary drive relative to said clutch means so that when the force of said clutch means resisting rotation is increased, power is transferred from said idler wheel member to an output means of said planetary drive, starting with a slow speed with high torque to a fast speed with lower torque by scheduled increments to enable rotation of said output shaft, under load resistance, without prime mover stall, and wherein said planetary drive output means rotates in a forward direction when said idler wheel member rotates in the same direction, and said transmission comprises disk brake means for enabling said planetary drive output means to rotate in a direction opposite said forward direction.

12. A transmission as recited in claim 11, wherein the speed ratio for said direction opposite said forward direction is the same as the starting forward speed ratio.

13. A transmission as recited in claim 11, wherein the maximum speed in said direction opposite said forward direction is reduced compared to said forward direction speed.

14. A transmission as recited in claim 6 wherein said transmission is programmable controlled by linkage means, said linkage means comprising a clutch bar pivoting on a fulcrum so that a first end of said bar exerts pressure to engage said clutch means when the opposite end of said bar has force exerted on it by a coil spring and the force of said spring is delayed in steps by pneumatic means and said clutch means slows and stops said idler wheel member in scheduled increments.

15. A clutch and continuously variable transmission comprising, a planetary drive having input means connected to a prime mover's output to be driven thereby, scheduled friction clutch means for gradually slowing and stopping the rotation of an idler wheel member of said planetary drive relative to said clutch means so that when the force of said clutch means resisting rotation is increased, power is transferred from said idler wheel member to an output means of said planetary drive, starting with a slow speed with high torque to a fast speed with lower torque by scheduled increments to enable rotation of an output shaft, under load resistance, without prime mover stall, and wherein said schedule means comprises electronic computerized tooling.

16. A transmission as recited in claim 15, wherein said computerized tooling comprises an electric motor operated linear screw actuator having a plunger connected to said clutch means for gradually engaging and disengaging said clutch means, said electric motor being computer programmable controlled for assisting forward, reverse and off movement of said electric motor, a speed sensor mounted on said prime mover, a speed sensor mounted on a vehicular wheel, said sensors connected to said computer, and a vehicle accelerator pedal connected to said computer.

17. The transmission of claim 16, wherein said computer is programmed to detect motor vehicle speed and torque requirements.

* * * * *